United States Patent
Torii et al.

(10) Patent No.: US 12,538,045 B2
(45) Date of Patent: Jan. 27, 2026

(54) IMAGING ELEMENT AND IMAGING DEVICE

(71) Applicant: TECHPOINT, INC., San Jose, CA (US)

(72) Inventors: Motonobu Torii, Tokyo (JP); Gen Kasai, Tokyo (JP)

(73) Assignee: TECHPOINT, INC., San Jose, CA (US)

( * ) Notice: Subject to any disclaimer, the term of this patent is extended or adjusted under 35 U.S.C. 154(b) by 30 days.

(21) Appl. No.: 18/290,625

(22) PCT Filed: Dec. 6, 2021

(86) PCT No.: PCT/JP2021/044683
§ 371 (c)(1),
(2) Date: Jan. 19, 2024

(87) PCT Pub. No.: WO2023/002643
PCT Pub. Date: Jan. 26, 2023

(65) Prior Publication Data
US 2024/0334082 A1    Oct. 3, 2024

(30) Foreign Application Priority Data

Jul. 19, 2021 (JP) ................................ 2021-119072

(51) Int. Cl.
*H04N 25/65* (2023.01)
*H04N 23/745* (2023.01)
(Continued)

(52) U.S. Cl.
CPC ........... *H04N 25/65* (2023.01); *H04N 23/745* (2023.01); *H04N 25/51* (2023.01); *H04N 25/78* (2023.01)

(58) Field of Classification Search
CPC ...... H04N 25/65; H04N 23/745; H04N 25/51; H04N 25/78; H04N 25/589; H04N 25/59; H04N 25/621; H04N 25/766; H10F 39/12
See application file for complete search history.

(56) References Cited

U.S. PATENT DOCUMENTS 9,948,875 B2 *    4/2018    Cremers ................ H04N 25/59
10,313,613 B2 *   6/2019    Velichko ............... H04N 25/53
(Continued)

FOREIGN PATENT DOCUMENTS

JP       H10256521 A    9/1998
JP       2006054276 A   2/2006
(Continued)

OTHER PUBLICATIONS

International Search Report for PCT/JP2021/044683 mailed Jan. 25, 2022, 5 pages (with English Translation).
(Continued)

*Primary Examiner* — Nhan T Tran
(74) *Attorney, Agent, or Firm* — NIXON & VANDERHYE (57) ABSTRACT

An imaging element includes: a photodiode, a first FD, a second FD, a TRG transistor, an amplification transistor, a DGC transistor for switching a conversion gain, when converting charges into a pixel signal, to a high gain or a low gain, a capacitor, an OFG transistor for transferring charges overflowing from the photodiode to the second FD, and an RST transistor. During an imaging action involving a long exposure time, after reset is carried out, with the conversion gain being switched to the high gain, the pixel signal is read and employed as a high-gain reset signal. Then, after the TRG transistor is conducted, the pixel signal is read and
(Continued)

employed as a high-gain signal. A first signal which is a difference between the high-gain signal and the high-gain reset signal is outputted.

12 Claims, 7 Drawing Sheets

(51) Int. Cl.
*H04N 25/51* (2023.01)
*H04N 25/78* (2023.01)

(56) References Cited

U.S. PATENT DOCUMENTS

| | | | |
|---|---|---|---|
| 10,560,649 B2 * | 2/2020 | Geurts | H04N 25/771 |
| 10,567,689 B2 * | 2/2020 | Velichko | H04N 25/78 |
| 10,791,292 B1 * | 9/2020 | Geurts | H04N 25/771 |
| 11,050,955 B2 | 6/2021 | Sakano et al. | |
| 11,343,439 B2 * | 5/2022 | Johnson | H04N 25/59 |
| 11,818,478 B2 * | 11/2023 | Innocent | H04N 25/59 |
| 2017/0099423 A1 | 4/2017 | Cremers et al. | |
| 2017/0366766 A1 * | 12/2017 | Geurts | H04N 25/531 |
| 2020/0154066 A1 | 5/2020 | Johnson | |
| 2021/0112212 A1 * | 4/2021 | Oh | H10F 39/8037 |
| 2021/0243350 A1 | 8/2021 | Johnson | |
| 2021/0289154 A1 | 9/2021 | Johnson et al. | |
| 2022/0036728 A1 | 2/2022 | Ucar et al. | |
| 2022/0385852 A1 * | 12/2022 | Miyauchi | H04N 25/771 |

FOREIGN PATENT DOCUMENTS

| | | |
|---|---|---|
| JP | 2009165186 A | 7/2009 |
| WO | 2017130728 A1 | 8/2017 |

OTHER PUBLICATIONS

Written Opinion of the ISA for PCT/JP2021/044683 mailed Jan. 25, 2022, 6 pages (with English Translation).

* cited by examiner

IMAGING ELEMENT AND IMAGING DEVICE

CROSS-REFERENCE TO RELATED APPLICATIONS

This application is the U.S. national phase of International Application No. PCT/JP2021/044683 filed Dec. 6, 2021 which designated the U.S. and claims priority to JP Patent Application No. 2021-119072 filed Jul. 19, 2021, the entire contents of each of which are hereby incorporated by reference.

TECHNICAL FIELD

This invention relates to an imaging element and an imaging device.

BACKGROUND ART

With an imaging device having an imaging element, it has hitherto been known that when an LED light source is imaged, a phenomenon called LED flicker occurs. The LED flicker is a phenomenon in which since the LED light source blinks rapidly at a constant frequency, the LED light source in the image appears to flicker or be off, depending on the timing of blinking and the exposure time of the imaging element.

If the exposure time of the imaging element is lengthened, LED flicker hardly occurs. However, charges exceeding the capacity of a photodiode of the imaging element occur, thereby saturating the photodiode, thus making it impossible to output signals corresponding to brightness. To deal with such saturation, a proposal has been made for a technology which, for a low-illuminance subject, forms an image obtained by long exposure, but for a high-illuminance subject, forms an image obtained by short exposure, and synthesizes these images. An LED light source, however, gives a high illuminance, so that an image obtained by short exposure is selected. Consequently, the aforementioned LED flicker arises.

In an attempt to solve the problems of the LED flicker and the photodiode saturation, a general imaging element coupled with a dual gain control transistor (hereinafter, DGC transistor) and a high capacity capacitor capable of storing charges generated in a large amount by long exposure is known (see, for example, Patent Document 1).

Figure 5:
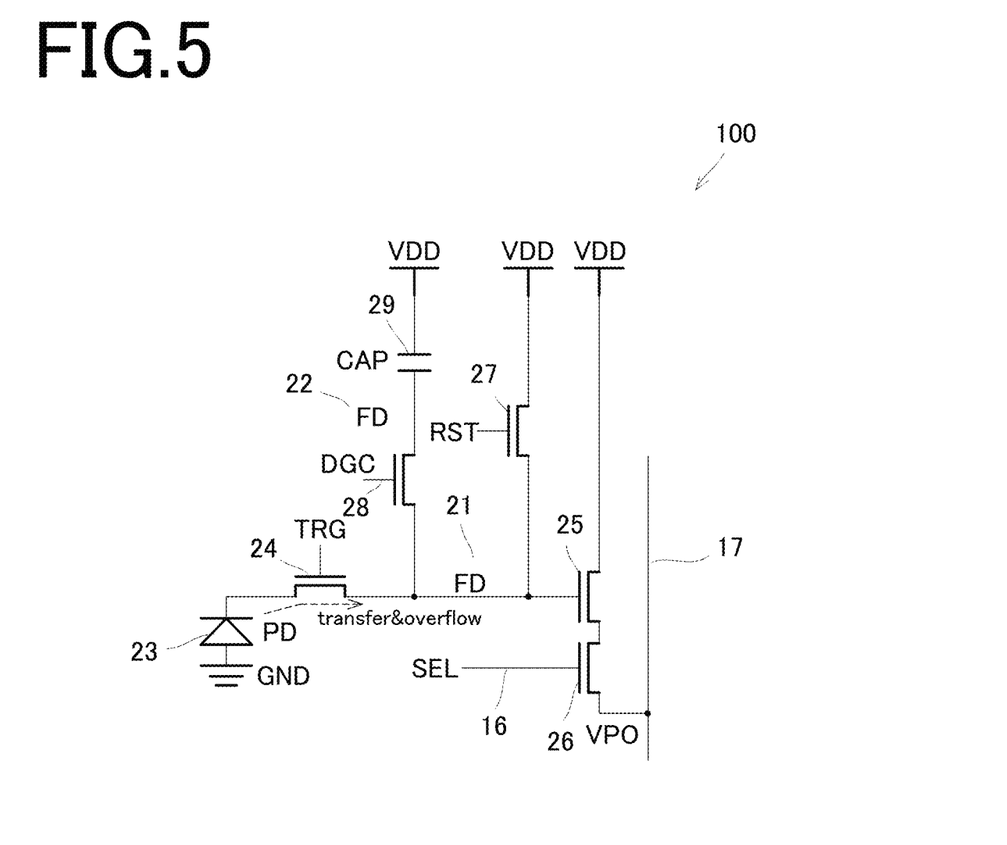
FIG. 5 is a circuit diagram showing the configuration of a pixel according to a conventional technology.

A pixel of a conventional imaging element will be described briefly using FIG. 5. FIG. 5 is a circuit diagram of a pixel which a conventional imaging element has.

A pixel 100 shown in FIG. 5 has a structure in which a DGC transistor 28, and a high capacity capacitor 29 capable of accumulating charges generated in a large amount by long exposure are added to a so-called 4 Tr pixel having 4 transistors per pixel.

Charges accumulated in a photodiode 23 are transferred by a transfer transistor (hereinafter, TRG transistor) 24 to a first floating diffusion (hereinafter, first FD) 21. The TRG transistor 24, even in a non-conducting state, enables charges overflowing from the photodiode 23 to be transferred to the first FD 21.

Even if the TRG transistor 24 is in the non-conducting state, the charges overflowing from the photodiode 23 are thus accumulated in the first FD 21. Hence, the first FD 21 cannot be subjected to a resetting operation needed before the charges are read as signals.

As a result, a reset level after long exposure depends on the subject or the exposure time, making it difficult to keep the signals of the pixel 100 within the range of an AD converter. Moreover, before long exposure is started, reset is performed. In this case, it takes long until charges are read as signals. This poses the problem that noises contained in the signals obtained from the pixel 100 deteriorate.

Generally, moreover, there is a technology, called pixel sharing, in which the pixel of an imaging element shares some of adjacent pixels, as reported in Patent Documents 2 and 3.

Figure 7:
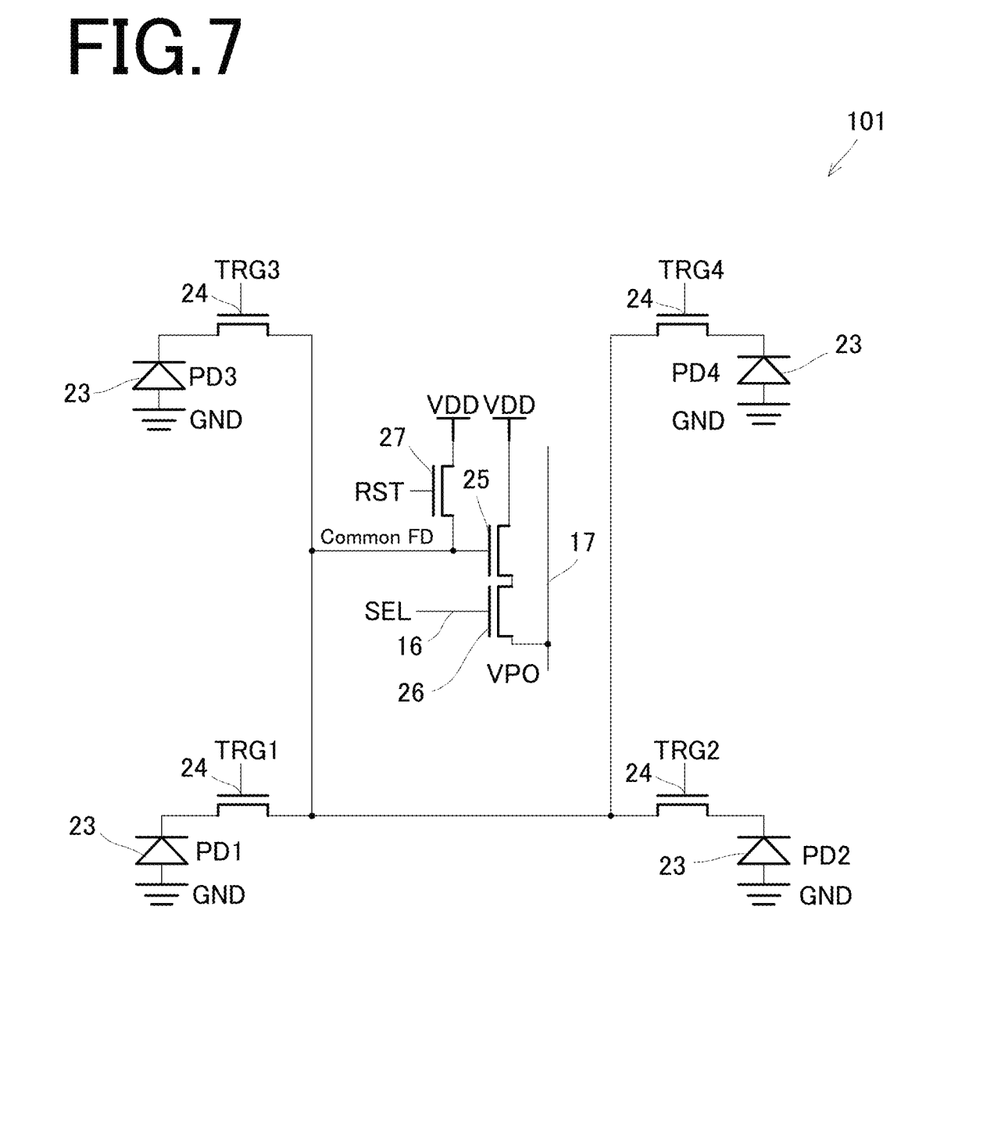
FIG. 7 is a circuit diagram showing the configuration of a pixel involving pixel sharing according to the conventional technology.

FIG. 7 displays a pixel 101 sharing a floating diffusion of a so-called 4 Tr pixel. If pixel sharing is not adopted, 4 Tr×4 pixels=16 Tr are required. The pixel 101 involving pixel sharing, on the other hand, can do with 7 Tr. Thus, pixel sharing is an indispensable technology for miniaturization.

With the pixel 100 shown in FIG. 5, however, charges overflowing from the photodiode 23 during the exposure time flow into the common floating diffusion 21. If pixel sharing is performed, therefore, charges of the adjacent pixel 100 will become mixed in the shared floating diffusion 21. Consequently, pixel sharing is impossible, imposing limitations on miniaturization.

PRIOR ART DOCUMENTS

Patent Documents

[Patent Document 1] USP2017/0099423
[Patent Document 2] JP-A-Hei-10-256521
[Patent Document 3] JP-A-2006-54276

SUMMARY OF THE INVENTION

Problems to be Solved by the Invention

The present invention has been accomplished in the light of the above-mentioned circumstances. It is an object of this invention to provide an imaging element and an imaging device which, while solving the problems of LED flicker and photodiode saturation, enable pixel sharing and facilitate keeping signals of a pixel within the range of an AD converter, and can obtain signals reduced in the influence of noises.

Means for Solving the Problems

A first aspect of the present invention, designed to solve the above-mentioned problems, resides in an imaging element comprising a photodiode for generating charges by photoelectric conversion; a first floating diffusion and a second floating diffusion for converting the charges into a potential corresponding to the amount of the charges; a transfer transistor for transferring the charges of the photodiode to the first floating diffusion; an amplification transistor for generating a pixel signal corresponding to the potential converted by the first floating diffusion; a dual gain control transistor, disposed between the first floating diffusion and the second floating diffusion, for switching a conversion gain, when converting the charges into a pixel signal, to a high gain or a low gain; a capacitor connected to the second floating diffusion; an overflow gate transistor disposed between the photodiode and the second floating diffusion; and a reset transistor for resetting the voltages of the first floating diffusion, the second floating diffusion, the photodiode, and the capacitor, wherein the imaging element can perform a series of imaging actions consisting of a shutter action, exposure, and reading of a pixel signal, the transfer transistor and the overflow gate transistor are configured such that when they are in a nonconductive state, the charges overflowing from the photodiode during the exposure flow into the second floating diffusion and the capacitor, and in a reading action of the imaging actions, after reset is carried out by the reset transistor, with the conversion gain being switched to the high gain by the dual gain control transistor, the pixel signal is read and employed as a high-gain reset signal, and then after the transfer transistor is conducted, the pixel signal is read and employed as a high-gain signal, whereupon a first signal which is a difference between the high-gain signal and the high-gain reset signal is outputted.

A second aspect of the present invention resides in the imaging element according to the first aspect, wherein in the reading action of the imaging actions, after the first signal is read, and then with the conversion gain being switched to the low gain by the dual gain control transistor, the transfer transistor is conducted, then the pixel signal is read and employed as a low-gain signal, and then after reset is carried out by the reset transistor, the pixel signal is read and employed as a low-gain reset signal, whereupon a second signal which is a difference between the low-gain signal and the low-gain reset signal is outputted.

A third aspect of the present invention resides in the imaging element according to the first or second aspect, wherein in a reading action during imaging actions taking a shorter time for the exposure than the imaging actions, after reset is carried out by the reset transistor, with the conversion gain being switched to the high gain by the dual gain control transistor, the pixel signal is read and employed as a short-term reset signal, and then after the transfer transistor is conducted, the pixel signal is read and employed as a short-term signal, whereupon a third signal which is a difference between the short-term signal and the short-term reset signal is outputted.

A fourth aspect of the present invention resides in the imaging element according to any one of the first to third aspects, wherein the capacitor is connected to a row selection signal, and the row selection signal can be set differently to a first potential during the exposure, or a second potential during the reading.

A fifth aspect of the present invention resides in the imaging element according to any one of the first to fourth aspects, wherein the imaging actions are performed, with the overflow gate transistor being turned on only upon resetting, or being kept in a constantly nonconductive state.

A sixth aspect of the present invention resides in the imaging element according to any one of the first to fifth aspects, wherein the photodiode, the transfer transistor, the overflow gate transistor, the dual gain control transistor, and the second floating diffusion are provided per pixel, and the first floating diffusion, the reset transistor, the amplification transistor, and a row selection transistor for row selection are shared among a plurality of adjacent pixels.

A seventh aspect of the present invention resides in an imaging device equipped with the imaging element according to any one of the first to sixth aspects.

Effects of the Invention

The present invention provides an imaging element and an imaging device which, while solving the problems of LED flicker and photodiode saturation, enable pixel sharing, facilitate keeping a pixel signal within the range of an AD converter, and can obtain a signal minimally affected by a noise.

MODE FOR CARRYING OUT THE INVENTION

Embodiment 1

Figure 1:
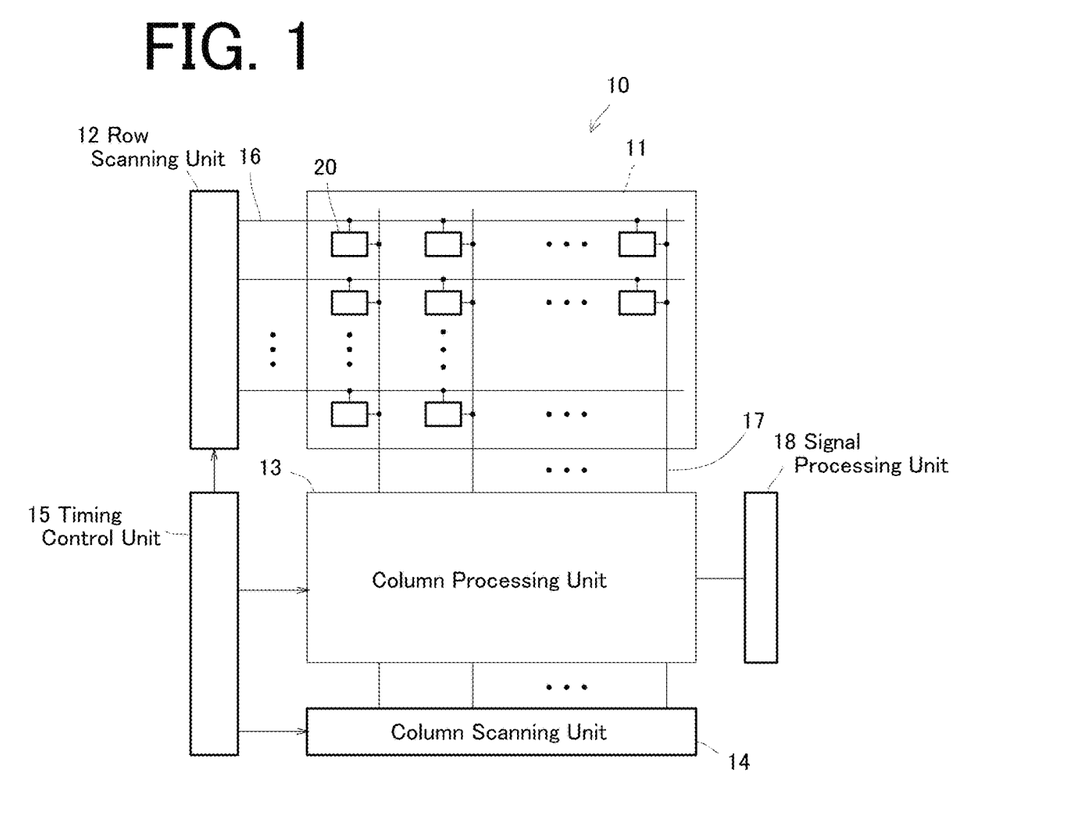
FIG. 1 is a block diagram showing the configuration of an imaging element according to Embodiment 1.

As shown in FIG. 1, an imaging element 10 according to this embodiment is an X-Y addressing CMOS sensor capable of reading a pixel signal per pixel 20. Concretely, the imaging element 10 is equipped with a pixel array unit 11, a row scanning unit 12, a column processing unit 13, a column scanning unit 14, a timing control unit 15, a row control line 16, a column signal line 17, and a signal processing unit 18. In the present embodiment, the respective units of the imaging element 10 may be mounted on the same substrate, but some of the units, such as the signal processing unit 18, may be mounted on a different substrate.

The pixel array unit 11 is of a configuration in which a multiplicity of the pixels 20 are arranged two-dimensionally in rows and columns (in a matrix). An analog signal outputted from the pixel 20 is called a pixel signal. The detailed configuration of the pixel 20 will be described later.

The pixel array unit 11 has a plurality of the pixels 20 arranged in the matrix (rows and columns), and has the row control line 16 wired for each row, and the column signal line 17 wired for each column. The row control line 16 transmits a drive signal for performing a drive when reading a pixel signal from the pixel 20.

The row scanning unit 12 is composed of a shift register, an address decoder, etc., and drives the respective pixels row by row. The pixel signals outputted from the respective pixels 20 in the row selected by the row scanning unit 12 are inputted to the column processing unit 13 through the respective column signal lines 17 column by column.

The column processing unit 13 performs various processings, such as correlated double sampling (CDS) and double data sampling (DDS), on the pixel signals. The column processing unit 13 is also provided with an analog-digital conversion function, converting an analog pixel signal into a digital pixel signal.

The column scanning unit 14 is composed of a shift register, an address decoder, etc., and selects unitary circuits, corresponding to the columns of the pixels 20 of the column processing unit 13, in turn. Upon selective scanning by the column scanning unit 14, the pixel signals signal-processed in each unitary circuit in the column processing unit 13 are outputted in turn.

The timing control unit 15 generates a clock signal and a control signal serving as bases for the actions of the row scanning unit 12, the column processing unit 13, and the column scanning unit 14, and give the clock signal or control signal to the row scanning unit 12, column processing unit 13, and column scanning unit 14, thereby controlling them.

The signal processing unit 18 performs signal processing of a pixel signal outputted from the column processing unit 13. Examples of the signal processing are various image processings such as correction of the black level, buffering of digital pixel signals, variation correction, and color tone correction. Moreover, the signal processing unit 18 may convert an N-bit parallel pixel signal into a serial pixel signal, and output it to the outside.

The pixel 20 will be described using FIG. 2. The pixel 20 is equipped with a photodiode 23, a transfer transistor (hereinafter, TRG transistor) 24, a first floating diffusion 21 (hereinafter, first FD 21), a second floating diffusion 22 (hereinafter, second FD 22), an amplification transistor 25, a row selection transistor (hereinafter, SEL transistor) 26, a reset transistor (hereinafter, RST transistor) 27, a DGC transistor 28, a capacitor 29, and an overflow gate transistor (hereinafter, OFG transistor) 30.

The photodiode 23 is an element for accumulating electrons conformed to the amount of light. Charges accumulated in the photodiode 23 are transferred by the TRG transistor 24 to the first FD 21. When, in the photodiode 23, charges become saturated and overflow, the overflowing charges are transferred to the second FD 22 even if the OFG transistor 30 is in a nonconducting state.

The first FD 21 and the second FD 22 convert the charges transferred from the photodiode 23 into voltage signals, and output them. The first FD 21 is disposed between the TRG transistor 24 and the amplification transistor 25. To the first FD 21, the RST transistor 27 and the DGC transistor 28 are connected. The second FD 22 is disposed between the DGC transistor 28 and the capacitor 29. To the second FD 22, the OFG transistor 30 is connected.

The TRG transistor 24 is disposed between the photodiode 23 and the first FD 21. When the gate is turned on, the TRG transistor 24 transfers the electrons of the photodiode 23 to the first FD 21.

The RST transistor 27 is disposed between a power supply voltage VDD and the first FD 21. The RST transistor 27 becomes conductive upon switching-on of a reset signal RST, resetting the potential of the first FD 21 to the power supply voltage VDD.

To the gate of the amplification transistor 25 is connected the first FD 21. To the drain and the source thereof are connected a power supply voltage VDD and the SEL transistor 27. The amplification transistor 25 outputs pixel signals, corresponding to the amount of the charges transferred to the first FD 21, to the SEL transistor 26.

The SEL transistor 26 is a transistor for bringing the pixel 20 of the row into a selected state. The SEL transistor 26 is turned on (rendered conductive) by a row selection signal SEL entered from the row scanning unit 12, and transmits the pixel signal outputted from the amplification transistor 25 to the column signal line 17.

The DGC transistor 28 is connected between the first FD 21 and the second FD 22. The DGC transistor 28 switches a conversion gain during conversion of the charges at the first FD 21 into voltage signals to a high gain or a low gain. When the DGC transistor 28 is turned on, the first FD 21 and the capacitor 29 are brought into conduction, resulting in a state called a low gain (low conversion gain, referred to hereinafter as LCG). In the LCG state, charges are accumulated in the capacitor 29 as well as the first FD 21, so that the pixel 20 can deal with a large amount of charges.

When the DGC transistor 28 is turned off, on the other hand, no charges are accumulated in the capacitor 29. Thus, a larger amount of charges than in the LCG state cannot be handled. However, a state called a high gain (high conversion gain, referred to hereinafter as HCG), in which the efficiency of conversion from charges into a potential is high, is achieved. Generally, HCG ensures better performance for a low illumination subject.

Figure 2:
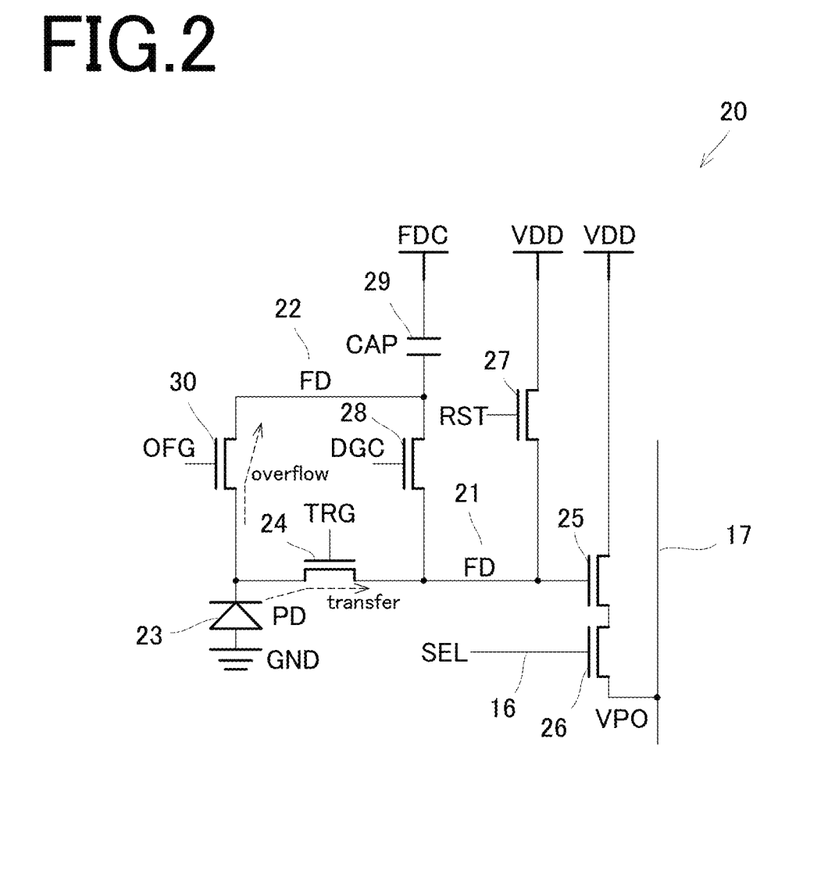
FIG. 2 is a circuit diagram showing the configuration of a pixel according to Embodiment 1.

The capacitor 29 are connected to the second FD 22 and the row selection signal SEL (designated in FIG. 2 as floating diffusion control, FDC). The capacity of the capacitor 29 is set at a value enough to store charges generated in a large amount in the photodiode 23 by long exposure to be described later. The potential V2 of the FDC is preferably set so that except in case of reading of the pixel signal to be described later, a difference in potential between the second FD 22 and the ground (GND) becomes as small as possible. This difference in potential may be adjustable, or fixed.

The OFG transistor 30 branches off from between the photodiode 23 and the TRG transistor 24, and is connected to the second FD 22. The OFG transistor 30 is configured such that even if the OFG transistor 30 is in a nonconductive state and the TRG transistor 24 is nonconductive, charges overflowing from the photodiode 23 flow into the second FD 22 via the OFG transistor 30. The nonconductive state of the OFG transistor 30 refers to a state in which a potential V1 applied to the gate is set so that, as stated above, the charges overflowing from the photodiode 23 can flow into the second FD 22 via the OFG transistor 30. The gate of the OFG transistor may be fixed at the potential V1.

Figure 3:
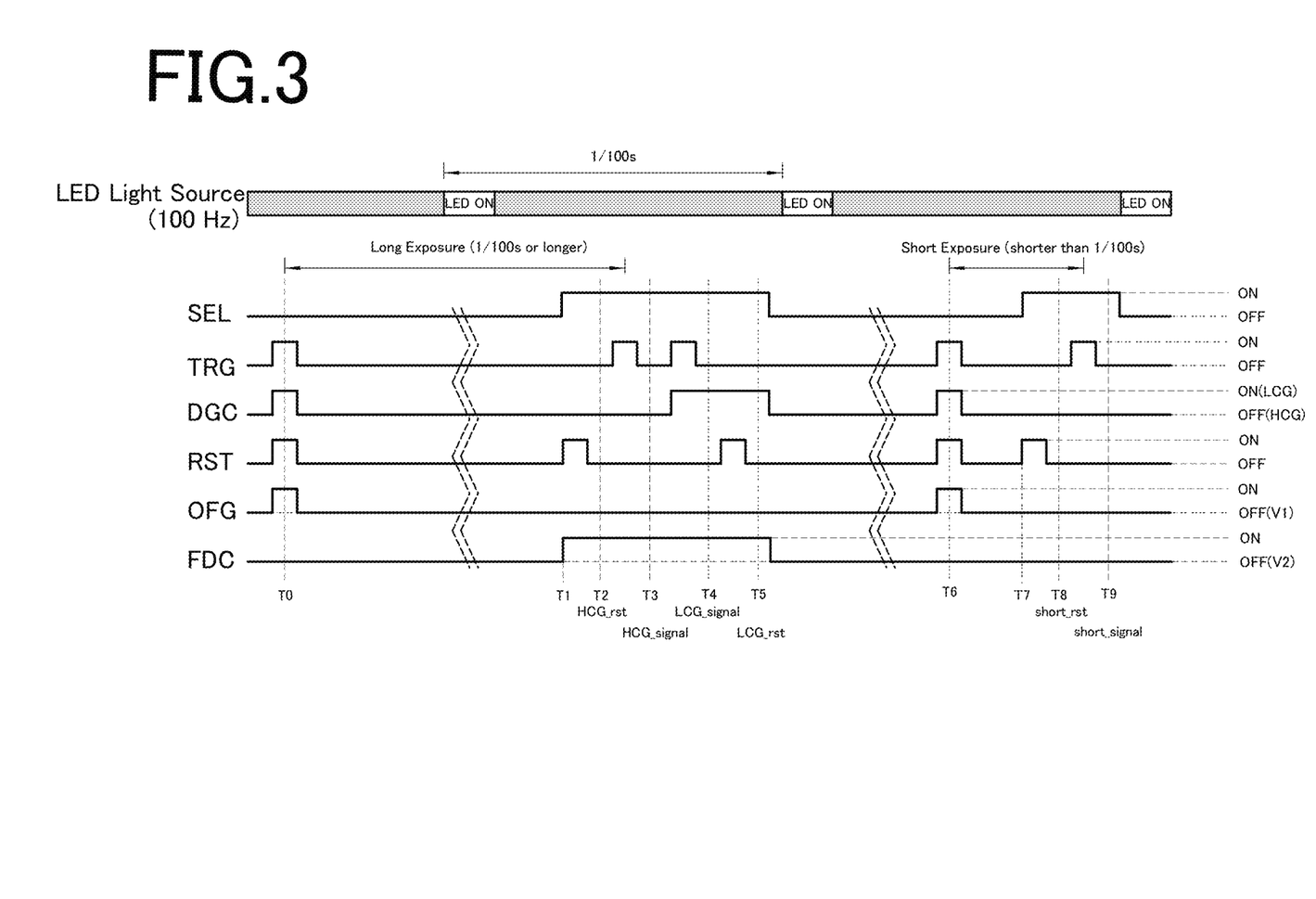
FIG. 3 is a timing chart for the imaging element according to Embodiment 1.

The actions of the pixel 20 will be described using FIG. 3. FIG. 3 is a timing chart for illustrating the actions of the pixel. An LED timing at the top of the drawing is constituted such that white-blanked parts represent the ON-time of an LED light source (light is on), while grey parts represent the OFF-time of the LED light source (light is off). In the example of the drawing, the LED light source becomes ON for a certain period of time, and then becomes OFF, every hundredth of a second.

SEL is a row selection signal applied to the SEL transistor 26. TRG is a signal applied to the TRG transistor 24. DGC is a signal applied to the DGC transistor 28. RST is a signal applied to the RST transistor 27. OFG is a signal applied to the OFG transistor 30. In regard to any of the signals, ON represents a conductive state, and OFF represents a nonconductive state. These signals are inputted to the respective transistors by the timing control unit 15. FDC represents the potential of the signal in question.

The imaging device of the present embodiment performs a series of actions, composed of a shutter action, exposure, and reading of a pixel signal, called imaging actions, and is capable of performing the first imaging actions or the second imaging actions, depending on whether the exposure time is short or long. For the first imaging actions, the exposure time is relatively long. For the second imaging actions, the exposure time is relatively short.

The first imaging actions will be described. First of all, the shutter action is performed (time T0). Concretely, during the shutter action, the TRG transistor 24, the DGC transistor 28, the RST transistor 27, and the OFG transistor 30 are all turned on. By the shutter action, all of the charges accumulated in the photodiode 23, the first FD 21, the second FD 22, and the capacitor 29 are reset.

After completion of the shutter action, the TRG transistor 24, the DGC transistor 28, the RST transistor 27, and the OFG transistor 30 are all turned off, and exposure is started. This exposure is performed until the TRG transistor 24 is brought to ON in the reading action. During the exposure, charges corresponding to the amount of light are accumulated in the photodiode 23.

The FDC is kept OFF during the exposure, namely, during the period from the reset action until the reading action begins. The potential V2 in the OFF state of the FDC is set so that the difference in potential between the second FD 22 and the GND is minimized. At least, the potential V2 is lower than the potential in the ON-state of the row selection signal SEL. By so making the potential V2 of the FDC low during exposure, the difference in potential between the second FD 22 and the GND can be narrowed. As a result, a leak current can be reduced, and the occurrence of a white spot in the pixel signal can be suppressed.

For the exposure, long exposure lasting for 1/100 second or more, for example, is set in order to reduce the influence of LED flicker. Employment of such a long exposure easily saturates the ordinary photodiode 23. As mentioned above, the OFG transistor 30 is designed such that even if the OFG transistor 30 is in a nonconductive state, the charges overflowing from the photodiode 23 flow into the capacitor 29 via the second FD 22.

Subsequently, the reading action for the charges of the photodiode 23 is performed (time T1-T5). Concretely, at the time T1, the SEL transistor 26 and the RST transistor 27 are turned on. During the reading action, the FDC is set to the ON-state. By turning on the RST transistor 27, the first ED 21 is reset.

After the above resetting, at the time T2 after the RST transistor 27 enters the OFF state, a pixel signal is read. This pixel signal is a reset signal in the OFF state of the DGC transistor 28, namely, in the HCG state, and will hereinafter be also referred to as HCG_rst (a high gain reset signal as recited in the claims of this application). The HCG_rst is sent to the column processing unit 13 via the column signal line 17, and read by the column processing unit 13. Since the reading of the pixel signal by the column processing unit 13 is publicly known, its detailed explanation is omitted herein. HCG_signal, LCG_rst, LCG_signal, Short_signal, and Short_rst to be described later are also read in the same manner as is the HCG_rst.

Then, after the time T2, the TRG transistor 24 is turned on. By so doing, the charges of the photodiode 23 are transferred to the first FD 21. Subsequently, at the time T3 when the TRG transistor 24 is turned off, a pixel signal is read. This pixel signal is also called HCG_signal (a high gain signal as recited in the claims).

HCG_signal-HCG_rst will hereinafter be referred to as a first signal. The first signal represents a pixel signal obtained when the amount of charges present in the photodiode 23 at the time of reading (time T1) has been converted in the HCG state. Processing for obtaining the first signal from the HCG_signal and the HCG_rst is performed by the column processing unit 13. Since it is of a publicly known configuration, however, its detailed explanation is omitted herein.

Then, after reading of the first signal, the TRG transistor 24 and the DGC transistor 28 are turned on. By so doing, the first FD 21, the second FD 22, the photodiode 23, and the capacitor 29 are brought into conduction. All of the charges accumulated in them are converted into pixel signals. At the time T4 after turning off the TRG transistor 24, a pixel signal is read. This pixel signal is a signal converted from the charges in the LCG state, and will hereinafter be also referred to as LCG_signal (a low gain signal as recited in the claims).

Then, after reading of the LCG_signal, the RST transistor 27 is turned on, and further turned off, whereafter at the time T5, a pixel signal is read. This pixel signal is a signal after resetting in the LCG state, and will hereinafter be also referred to as LCG_rst (a low gain reset signal as recited in the claims).

LCG_signal-LCG_rst will hereinafter be referred to as a second signal. The second signal represents a pixel signal obtained when the amounts of charges present in the first FD 21, the second FD 22, the photodiode 23, and the capacitor 29 have been converted in the LCG state. Processing for obtaining the second signal from the LCG_signal and the LCG_rst is performed by the column processing unit 13. Since a configuration therefor is a publicly known one, however, its detailed explanation is omitted herein.

Next, the second imaging actions involving short exposure will be described. The short exposure is performed, for example, in a shorter time than 1/100 second.

The DGC transistor 28 is in the OFF state after long exposure. During short exposure, the FDC is maintained at the potential V2. First of all, a shutter action is performed (time T6). Concretely, during the shutter action, the TRG transistor 24, the RST transistor 27, the OFG transistor 30, and the DGC transistor 28 are all turned on. By the shutter action, all of the charges accumulated in the photodiode 23, the first FD 21, the second FD 22, and the capacitor 29 are reset.

After completion of the shutter action, the TRG transistor 24, the RST transistor 27, the OFG transistor 30, and the DGC transistor 28 are turned off, and exposure is started. This exposure is performed until the TRG transistor 24 is brought to ON at the time of the reading action. During the exposure, charges corresponding to the amount of light are accumulated in the photodiode 23.

Subsequently, a reading action for the charges of the photodiode 23 is performed (time T7-T9). Concretely, at the time T7, the SEL transistor 26 and the RST transistor 27 are turned on. By turning on the RST transistor 27, the first FD 21 is reset.

At the time T8 after the above resetting is done and the RST transistor 27 enters the OFF state, a pixel signal is read. This pixel signal is a pixel signal in the OFF state of the DGC transistor 28, namely, in the HCG state, and will hereinafter be also referred to as Short_rst (a short-term reset signal as recited in the claims).

Then, after reading of the Short_rst, the TRG transistor 24 is turned on. By so doing, charges are transferred from the photodiode 23 to the first FD 21. At the time T9 after the TRG transistor 24 is turned off, a pixel signal is read. This pixel signal is a pixel signal in the HCG state, and will hereinafter be also referred to as Short_signal (a short-term signal as recited in the claims).

Short_signal-Short_rst will hereinafter be referred to as a third signal. The third signal represents a pixel signal obtained when the amount of charges present in the photodiode 23 has been converted in the HCG state during short exposure. Processing for obtaining the third signal from the Short_signal and the Short_rst is performed by the column processing unit 13. Since a configuration therefor is a publicly known configuration, however, its detailed explanation is omitted herein.

The imaging element 10 synthesizes the first and second signals obtained as above, thereby becoming capable of outputting a signal which is not saturated even upon long exposure and whose LED flicker is suppressed. By synthesizing the first to third signals, moreover, an image reduced in LED flicker and falling within a high dynamic range can be formed. This synthesis of the first to third signals is performed by the signal processing unit 18. Since it can be performed using a publicly known method, however, its detailed explanation is omitted herein.

Figure 4:
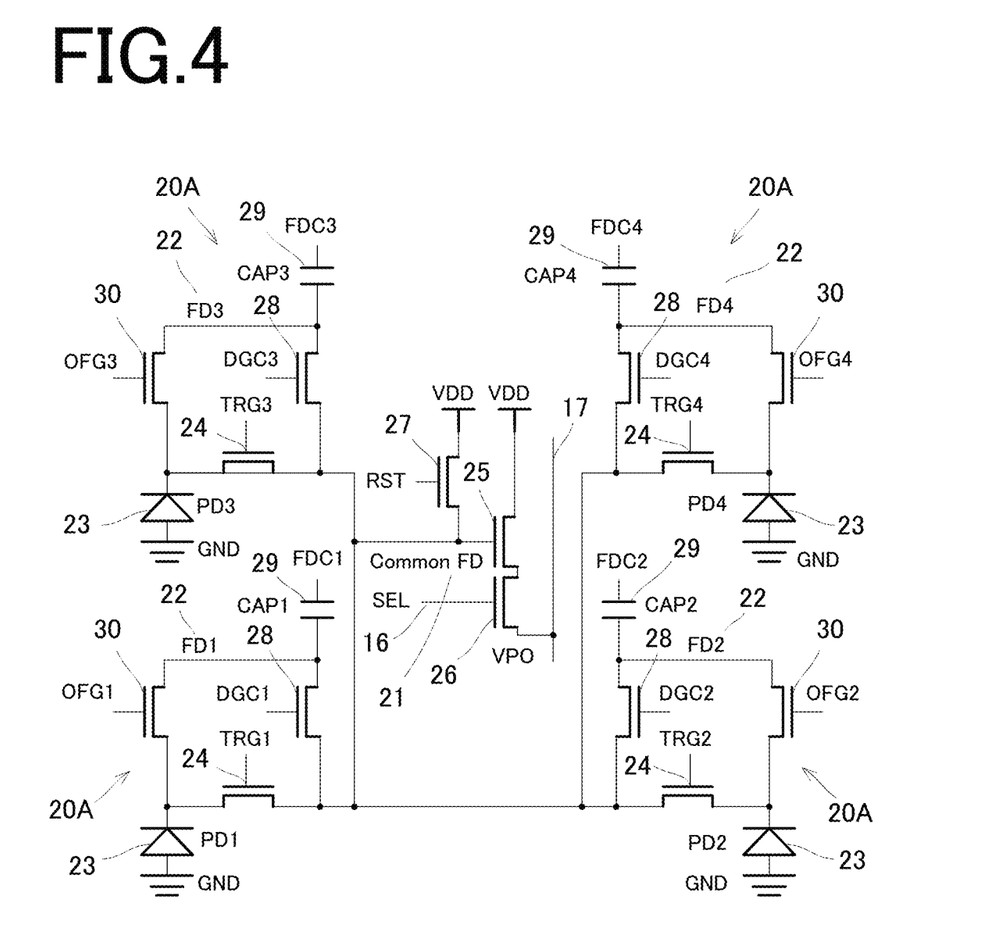
FIG. 4 is a circuit diagram showing the configuration of a pixel involving pixel sharing according to Embodiment 1.

FIG. 4 illustrates an example of pixel sharing in which a floating diffusion is shared among four adjacent pixels in addition to the present invention.

A photodiode 23, a TRG transistor 24, a DGC transistor 28, an OFG transistor 30, a second FD 22, and a capacitor 29 make up a pixel 20A. In this example, four of the pixels 20A are constructed. In connection with a first FD 21, an RST transistor 27, an amplification transistor 25, and an SEL transistor 26, each one of them is shared among the four pixels 20A. In the case of this configuration, charges overflowing from each photodiode 23 during exposure flow into the second FD 22 and the capacitor 29 possessed by each pixel 20A. Thus, the charges of the respective pixels 20A do not mix in the common first FD 21.

In connection with an FDC, it may be provided as separate signals for the four pixels 20A, or as a signal common to the four pixels to decrease wiring. In regard to an OFG, it may be provided as separate signals for the four pixels 20A, or as a signal common to the four pixels to decrease wiring. Alternatively, a method of employing a fixed potential common to the four pixels is conceivable. Reading from the sharing pixels is performed by a publicly known method, and thus its detailed explanation is omitted herein.

Using FIGS. 5 and 6, a conventional pixel 100 will be described for comparison with the aforementioned imaging element 10 of the present embodiment. In the pixel 100, the same parts as those in the pixel 20 of the imaging element 10 will be assigned the same letters or numerals, and duplicate explanations will be omitted.

As shown in FIG. 5, the conventional pixel 100 is different from the pixel of the imaging element 10 of the present embodiment in that it lacks an OFG transistor 30. As discussed about the conventional technology, a TRG transistor 24, even in a nonconductive state, permits charges overflowing from a photodiode 23 to be transferred to a first FD 21. With the conventional pixel 100, therefore, the charges overflowing from the photodiode 23 flow into the first FD 21 through the TRG transistor 24, and further flow into a second FD 22 and a capacitor 29 through a DGC transistor 28.

Figure 6:
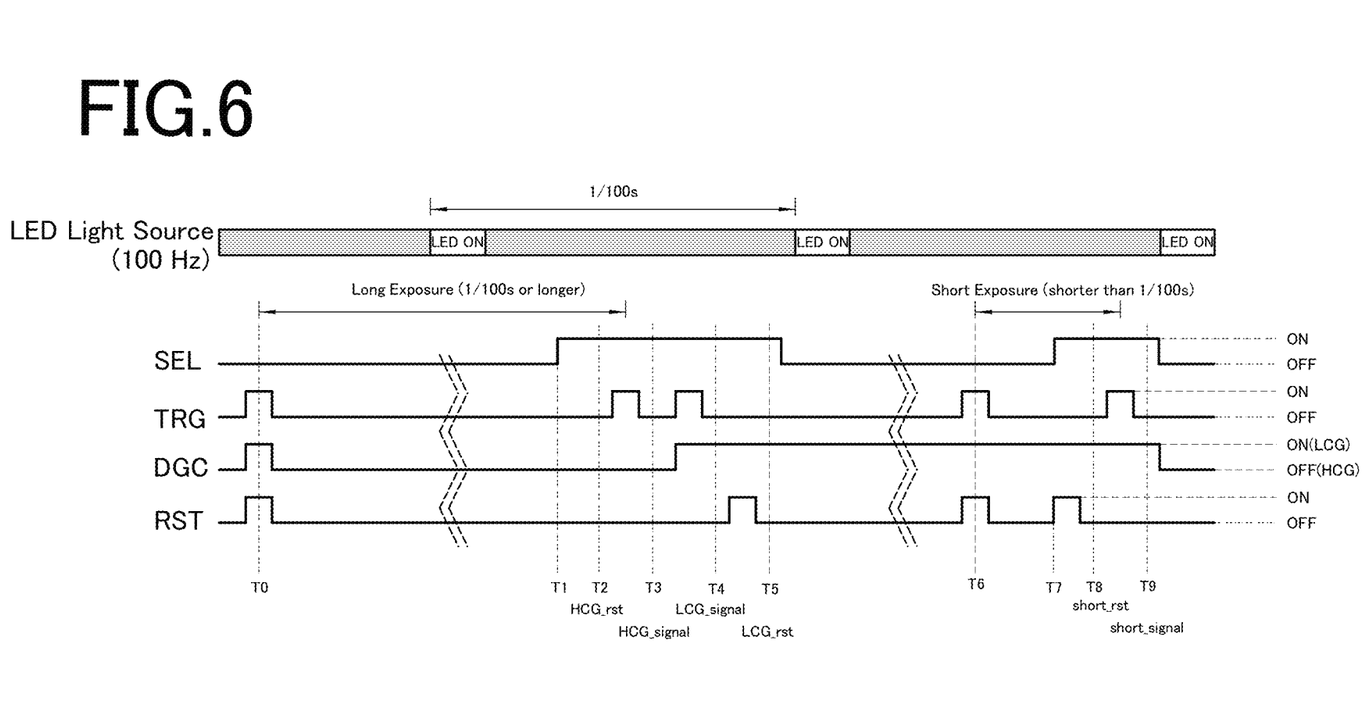
FIG. 6 is a timing chart for an imaging element according to the conventional technology.

FIG. 6 is a timing chart illustrating the actions of the conventional pixel 100. A shutter action at time T0 is the same as that in the imaging element 10 of the present embodiment, and thus duplicate explanations will be omitted.

Then, at time T1 through time T5, reading of a pixel signal is performed. In the imaging element 10 of the present embodiment, the RST transistor 27 is in the ON state during the period from the time T1 to time T2 (see FIG. 3). In the conventional pixel 100, an RST transistor 27 cannot be turned on during a period from the time T1 to the time T2.

The reason why the RST transistor 27 cannot be turned on during this period is as follows: If long exposure is performed in an attempt to suppress LED flicker, the photodiode 23 has a possibility of saturation. To avoid this saturation, the TRG transistor 24 is adapted to transfer charges overflowing from the photodiode 23 to the first FD 21. Consequently, charges which must be converted into pixel signals are stored in the first FD 21 during the period from the time T1 to the time T2. Thus, the first FD 21 cannot be reset.

In the conventional pixel 100, as noted above, for HCG_rst and HCG_signal, the first ED 21 cannot be reset before reading. Hence, the reset level after long exposure depends on the subject or the exposure time, making it difficult to hold the pixel signal of the pixel 20 within the range of AD conversion. Furthermore, the period from the time T0, when the first FD 21 is reset, until the time T3, when the HCG_rst and the HCG_signal are read, becomes long, thus deteriorating noises of the HCG_rst and the HCG_signal.

In connection with the conventional pixel 100, the actions at the time T2 and later are the same as those in the imaging element 10 of the present embodiment. Thus, duplicate explanations concerned therewith will be omitted.

The features of the imaging element 10 of the present embodiment will be described in consideration of the differences from the conventional pixel 100 explained above.

With the conventional pixel 100, as mentioned above, in case long exposure is performed to suppress LED flicker, the first FD 21 cannot be reset in reading the pixel signal (see the time T1 to the time T2 in FIG. 6).

In the imaging element 10 of the present embodiment, on the other hand, charges overflowing from the photodiode 23 are transferred to the second FD 22, rather than the first FD 21, by the OFG transistor 30. Since the charges that have thus overflowed are accumulated in the second FD 22 and the capacitor 29. Therefore, the first FD 21 can be reset.

In the reading of the first signal, as noted above, reset is performed immediately before reading of HCG_rst and HCG_signal. Hence, the reset level after long exposure does not depend on the subject or the exposure time, and it is easy to hold the pixel signal within the range of AD conversion. Furthermore, as compared with the conventional pixel 100, the period from the time T1, when the first FD 21 is reset, until the time T3, when the HCG_rst and the HCG_signal are read, becomes short, so that noises of the first signal (HCG_rst and HCG_signal) can be reduced.

According to the imaging element 10 of the present embodiment, moreover, the first signal is the pixel signal converted from the charges in the HCG state during long exposure. Thus, LED flicker is suppressed, and the low illumination subject is imaged with higher quality.

In the imaging element 10 of the present embodiment, after the first signal is read, reading of the second signal is performed. The second signal is obtained in the LCG state, namely, from all of the charges of the photodiode 23, the first FD 21, the second FD 22, and the capacitor 29. According to the imaging element 10 of this configuration, the first signal and the second signal are synthesized, whereby an image, whose LED flicker is suppressed and in which saturation does not occur even upon long exposure, can be obtained.

The imaging element 10 of the present embodiment reads the third signal upon short exposure by the second imaging actions. The third signal is obtained upon short exposure and in the HCG state. According to the imaging element 10 of such a configuration, the first signal, the second signal, and the third signal are synthesized, whereby an image, whose LED flicker is suppressed, in which saturation does not occur even upon long exposure, and which falls within a high dynamic range, can be obtained.

In the imaging element 10 of the present embodiment, the capacitor 29 is connected to the row selection signal (FDC), and the row selection signal can be set at different potentials, i.e. the first potential (V2 (OFF) in FIG. 3) during exposure and the second potential (ON in FIG. 3) at the time of reading. In the above-mentioned embodiment, the potential during exposure is set at the potential V2 which is lower than the potential of the row selection signal in the ON state. During exposure, therefore, the difference in potential between the second FD 22 and the GND can be rendered small. Hence, the leak current can be decreased, and the occurrence of a white spot in the pixel signal can be suppressed.

In the imaging element 10 of the present embodiment, the OFG transistor 30 may be turned on at the time of resetting, or may be always kept OFF. By so doing, an electric power consumption in the OFG transistor 30 can be curtailed, and signal lines in the horizontal direction can be decreased.

In the imaging element 10 of the present embodiment, pixel sharing is possible as shown in FIG. 4, and the number of elements for each pixel can be reduced. Thus, the problems of LED flicker and the saturation of the photodiode 23 can be solved, with miniaturization being achieved.

The foregoing imaging element 10 is mounted on an imaging device, although there is no particular illustration therefor. Examples of the imaging device are a camera for taking a moving picture or a still picture, a smartphone with a camera function, and so on. Such an imaging device has, in addition to the imaging device 10, an optical system for making light incident on the imaging element 10, a memory for storing a pixel signal, the signal processing unit 18 shown in FIG. 1, an output unit, a control unit, etc.

The optical system, for example, is equipped with a zoom lens, a focus lens, a diaphragm, etc., and makes light from the outside incident on the imaging element 10. The memory temporarily stores a pixel signal outputted from the imaging element 10. The signal processing unit 18 performs signal processing using the pixel signal stored in the memory, such as noise removal or white balance adjustment, to form image data. The signal processing unit 18 also performs the synthesis of the first to third pixels to form image data. The output unit includes a display for displaying the image data processed by the signal processing unit 18; communication means for sending the image data to a communicable device other than the imaging device; and an interface for transferring the image data to recording media such as a semiconductor memory and a magnetic disk. The control unit controls the above optical system and imaging element, controls the signal processing unit 18, and controls an output to the output unit.

According to the imaging device, as described above, it is easy to hold the pixel signal within the range of AD conversion, and it is possible to reduce noises of the first signal (HCG_rst and HCG_signal).

Other Embodiments

The embodiment of the present invention and a relevant example have been described above. However, the fundamental configuration of the present invention is in no way limited to the foregoing one.

In the imaging element 10 of Embodiment 1, for example, the OFG transistor 30 is in the ON state during the shutter action, and in the OFF state in other situations. As noted therein, signals concerned with the OFG transistor 30 may be variable, but without being limited thereto, may be fixed at the potential V1.

In the imaging element 10 of Embodiment 1, moreover, the capacitor 29 is connected to the row selection signal, but such a constitution is not limiting. For example, the capacitor 29 may be connected to the power supply voltage VDD.

In the imaging element 10 of Embodiment 1, the first imaging actions and the second imaging actions are performed. However, the execution of these imaging actions is not limiting. For example, it is permissible to perform only the first imaging actions involving long exposure, without performing the second imaging actions involving short exposure.

EXPLANATIONS OF LETTERS OR NUMERALS

10 . . . . Imaging element, 20 . . . . Pixel, 21 . . . . First floating diffusion, 22 . . . . Second floating diffusion, 23 . . . Photodiode, 24 . . . . TRG transistor, 25 . . . . Amplification transistor, 26 . . . . SEL transistor, 27 . . . . RST transistor, 28 . . . . DGC transistor, 29 . . . . Capacitor, 30 . . . . OFG transistor

The invention claimed is:

1. An imaging element, comprising:
a photodiode for generating charges by photoelectric conversion;
a first floating diffusion and a second floating diffusion for converting the charges into a potential corresponding to an amount of the charges;
a transfer transistor for transferring the charges of the photodiode to the first floating diffusion;
an amplification transistor for generating a pixel signal corresponding to the potential converted by the first floating diffusion;
a dual gain control transistor, disposed between the first floating diffusion and the second floating diffusion, for switching a conversion gain, when converting the charges into a pixel signal, to a high gain or a low gain;
a capacitor connected to the second floating diffusion;
an overflow gate transistor disposed between the photodiode and the second floating diffusion; and
a reset transistor for resetting voltages of the first floating diffusion, the second floating diffusion, the photodiode, and the capacitor,
wherein the imaging element can perform a series of imaging actions consisting of a shutter action, exposure, and reading of a pixel signal,
the transfer transistor and the overflow gate transistor are configured such that when the transfer transistor and the overflow gate transistor are in a nonconductive state, the charges overflowing from the photodiode during the exposure flow into the second floating diffusion and the capacitor, and
in a reading action of the imaging actions, after reset is carried out by the reset transistor, with the conversion gain being switched to the high gain by the dual gain control transistor, the pixel signal is read and employed as a high-gain reset signal, and then after the transfer transistor is conducted, the pixel signal is read and employed as a high-gain signal, whereupon a first signal which is a difference between the high-gain signal and the high-gain reset signal is outputted.

2. The imaging element according to claim 1, wherein in the reading action of the imaging actions, after the first signal is read, and then with the conversion gain being switched to the low gain by the dual gain control transistor, the transfer transistor is conducted, then the pixel signal is read and employed as a low-gain signal, and then after reset is carried out by the reset transistor, the pixel signal is read and employed as a low-gain reset signal, whereupon a second signal which is a difference between the low-gain signal and the low-gain reset signal is outputted.

3. The imaging element according to claim 1, wherein in a reading action during imaging actions taking a shorter time for the exposure than the imaging actions, after reset is carried out by the reset transistor, with the conversion gain being switched to the high gain by the dual gain control transistor, the pixel signal is read and employed as a short-term reset signal, and then after the transfer transistor is conducted, the pixel signal is read and employed as a short-term signal, whereupon a third signal which is a difference between the short-term signal and the short-term reset signal is outputted.

4. The imaging element according to claim 1, wherein the capacitor is connected to a row selection signal, and the row selection signal can be set differently to a first potential during the exposure, or a second potential during the reading.

5. The imaging element according to claim 1, wherein the imaging actions are performed, with the overflow gate transistor being turned on only upon resetting, or being kept in a constantly nonconductive state.

6. The imaging element according to claim 1, wherein the photodiode, the transfer transistor, the overflow gate transistor, the dual gain control transistor, and the second floating diffusion are provided per pixel, and the first floating diffusion, the reset transistor, the amplification transistor, and a row selection transistor for row selection are shared among a plurality of adjacent pixels.

7. An imaging device equipped with the imaging element according to claim 1.

8. The imaging element according to claim 2, wherein in a reading action during imaging actions taking a shorter time for the exposure than the imaging actions, after reset is carried out by the reset transistor, with the conversion gain being switched to the high gain by the dual gain control transistor, the pixel signal is read and employed as a short-term reset signal, and then after the transfer transistor is conducted, the pixel signal is read and employed as a short-term signal, whereupon a third signal which is a difference between the short-term signal and the short-term reset signal is outputted.

9. The imaging element according to claim 8, wherein the capacitor is connected to a row selection signal, and the row selection signal can be set differently to a first potential during the exposure, or a second potential during the reading.

10. The imaging element according to claim 9, wherein the imaging actions are performed, with the overflow gate transistor being turned on only upon resetting, or being kept in a constantly nonconductive state.

11. The imaging element according to claim 10, wherein the photodiode, the transfer transistor, the overflow gate transistor, the dual gain control transistor, and the second floating diffusion are provided per pixel, and the first floating diffusion, the reset transistor, the amplification transistor, and a row selection transistor for row selection are shared among a plurality of adjacent pixels.

12. An imaging device equipped with the imaging element according to claim 11.

* * * * *